May 26, 1936.    S. R. HARDING    2,041,758
COUNTER-ACTUATING MEANS FOR EDUCATIONAL TEST CHECKING MACHINES
Original Filed March 27, 1933    3 Sheets-Sheet 1
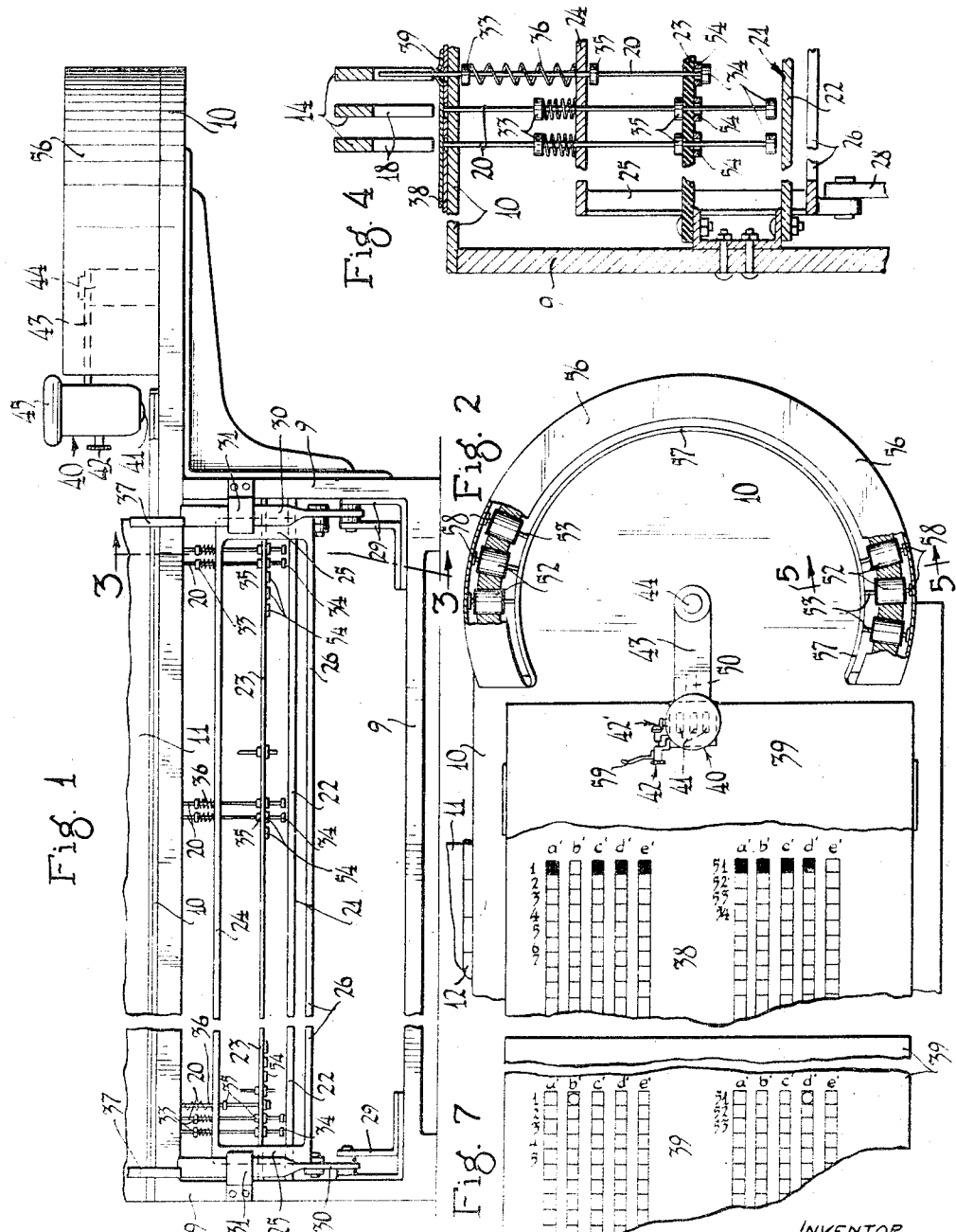
INVENTOR
SAMUEL R. HARDING
BY HIS ATTORNEYS May 26, 1936. S. R. HARDING 2,041,758
COUNTER-ACTUATING MEANS FOR EDUCATIONAL TEST CHECKING MACHINES
Original Filed March 27, 1933 3 Sheets-Sheet 2
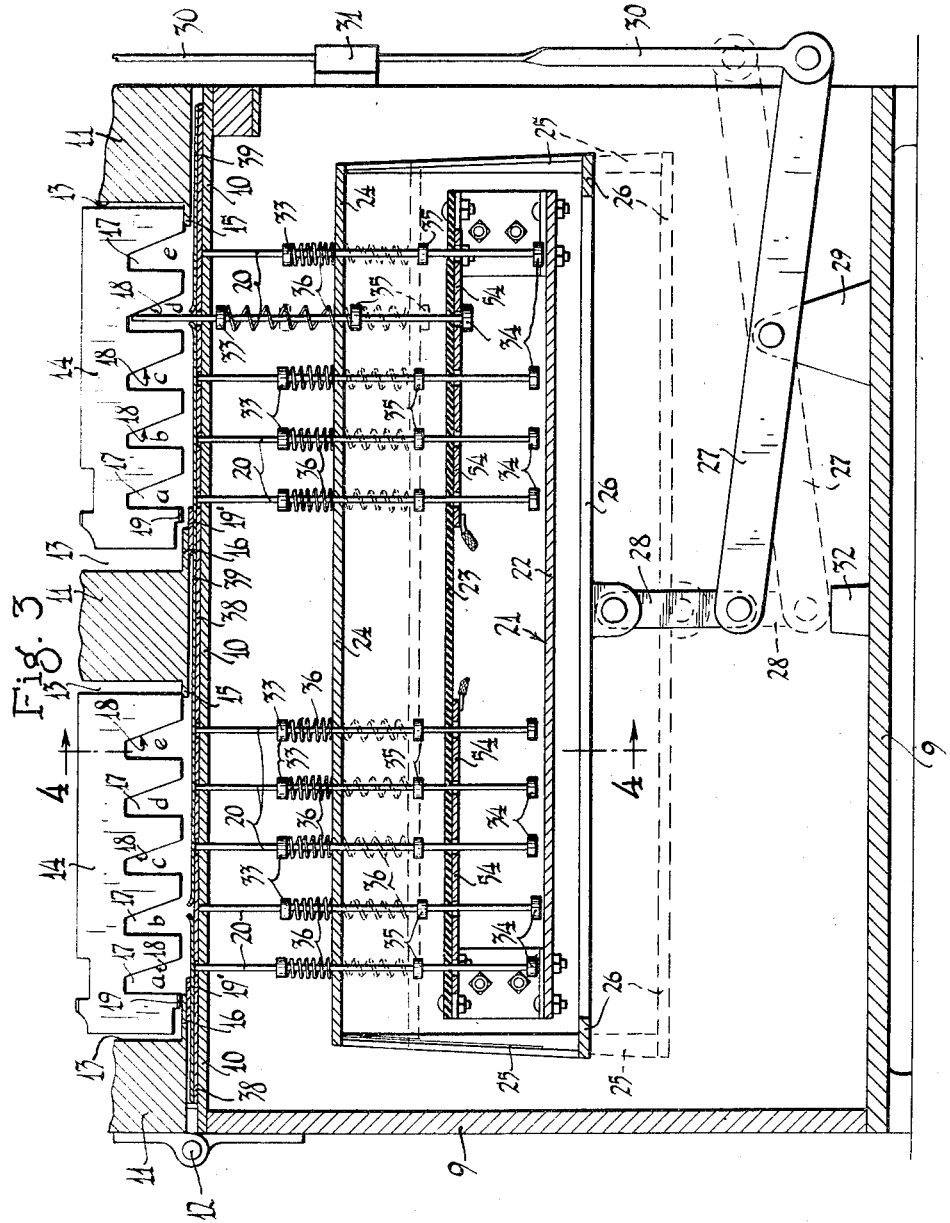
INVENTOR
SAMUEL R. HARDING
BY HIS ATTORNEYS
Merchant & Kilgore May 26, 1936.　　　　S. R. HARDING　　　　2,041,758
COUNTER-ACTUATING MEANS FOR EDUCATIONAL TEST CHECKING MACHINES
Original Filed March 27, 1933　　3 Sheets-Sheet 3
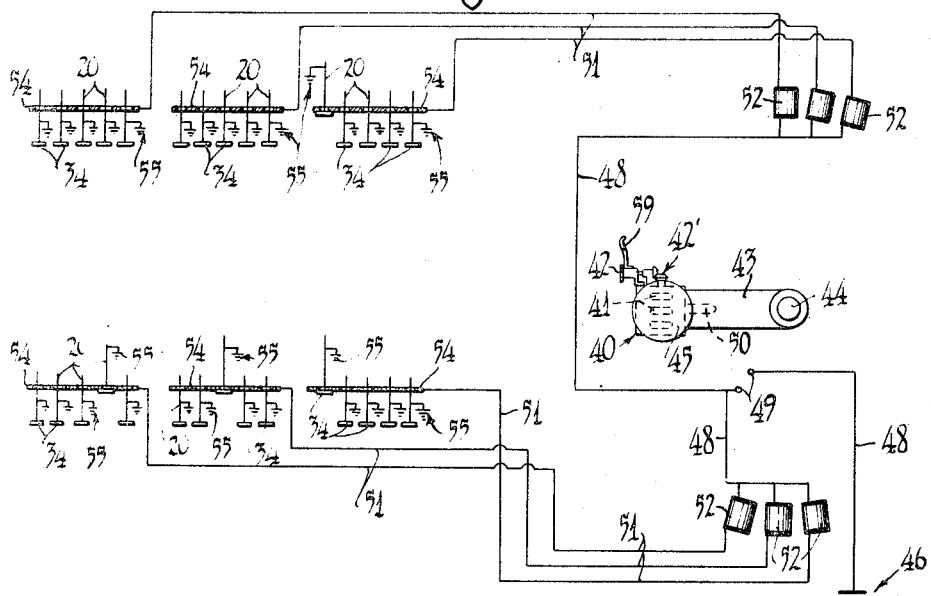
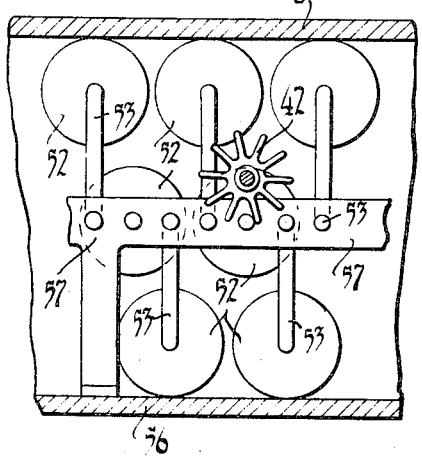
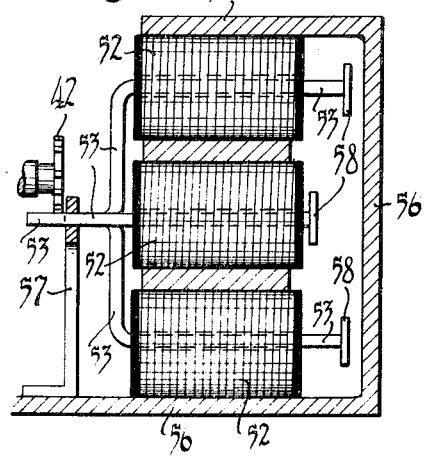
INVENTOR
SAMUEL R. HARDING
By His Attorneys Patented May 26, 1936

2,041,758

UNITED STATES PATENT OFFICE 2,041,758

COUNTER-ACTUATING MEANS FOR EDUCATIONAL TEST CHECKING MACHINES

Samuel R. Harding, Aberdeen, S. Dak.

Application March 19, 1934, Serial No. 716,300

4 Claims. (Cl. 35—48)

My present invention relates to selectively controlled printing devices and more particularly to electrically operated actuators for a counter intended for general use but especially well adapted for use in connection with an educational test checking machine. This invention, in part, is a continuation of my pending United States application for patent filed March 27, 1933, under Serial Number 662,866, Patent Number 2,030,207, Feb. 11, 1936, and entitled "Educational test checking machine."

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view of an educational test checking machine fully described and broadly claimed in the application heretofore identified and having the invention embodied therein;

Fig. 2 is a plan view of the parts shown in Fig. 1, with some parts broken away, with other parts removed, and with still other parts sectioned;

Fig. 3 is a fragmentary view principally in section taken on the line 3—3 of Fig. 1, on an enlarged scale;

Fig. 4 is a fragmentary detail view principally in section taken on the line 4—4 of Fig. 3;

Fig. 5 is a detail view in section taken on the line 5—5 of Fig. 2, on an enlarged scale;

Fig. 6 is a left hand elevation of the parts shown in Fig. 5;

Fig. 7 is a fragmentary plan view of the answer sheet; and

Fig. 8 is a wiring diagram.

The educational test checking machine illustrated includes a housing 9 supported on short legs, a table or bed 10 forming a top for said housing, and a head 11 connected to said bed by hinges 12 for opening and closing movements and normally held closed by a latch, not shown. Formed in the head 11, at its under side, is a multiplicity of deep slot-like ways 13 that extend transversely thereof and arranged in two rows. In each way 13 is a type slug or bar 14 normally resting on front and rear ledges 15 and 16, respectively, and which ledges extend transversely across the ways 13 at the ends thereof. These ledges 15 and 16 support the slugs 14 with freedom for a limited endwise sliding movement in the ways 13 and for slight rocking movement in the plane thereof on the ledges 15 when in their extreme right hand positions. Any number of slugs 14 may be used depending upon the capacity of the machine. The present machine is designed for fifty slugs in each row or a total of one hundred slugs.

In the arrangement of the machine illustrated only one slug 14 is used to answer a given question and hence one-hundred questions may be answered; but when desirable or necessary a plurality of slugs 14 may be set aside and any one used to answer a multiple choice question; or a plurality of said slugs may be used for answering questions of the matching type.

The slugs 14 as they appear when the head 11 is open will be designated numerically beginning with 1 in the upper end of the right hand column and beginning with 51 in the upper end of the left hand column. Of course, when the head 11 is closed, the order in which the slugs 14 are numbered will be reversed and number 1 slug will be at the upper left hand corner of the head 11.

Formed in each slug 14, at its lower longitudinal edge, are, as shown, five deep notches 17 that are spaced longitudinally of said slug equi-distances apart. These notches 17 are further designated individually by the letters a, b, c, d, e, which read from the left to the right, see Fig. 3. The left hand edge of each notch 17 is perpendicular to the lower longitudinal edge thereof and the right hand edge of each notch 17 is oblique and affords a cam surface 18, for a purpose that will presently appear. Formed with the lower longitudinal edge of each slug 14, near the left hand end thereof, is a depending type character 19. Normally the slugs 14 are in their extreme left hand positions and in which positions the type characters 19 rest on the ledges 16, as shown, in the left hand row of slugs 14, see Fig. 3. For each slug 14 are five upright selector pins 20, one for each cam surface 18.

Within the housing 9 is a fixed frame 21 comprising a bottom plate 22 and a top plate 23 of fibre or other insulating material and which plates are vertically spaced apart. The selector pins 20 extend through holes in the bed 10, the top plate 23, and a spring compression plate 24 between the bed 10 and the top plate 23. Said spring compression plate 24 is rigidly secured to four corner posts 25, outwardly of the frame 21, on a rectangular vertically movable frame 26. This movable frame 26 is supported by links 28 from the inner ends of a pair of levers 27.

The levers 27 are independently pivoted to bearings 29 on the bottom of the housing 9 and a pair of upright rods 30 is pivoted, at their lower ends, to the outer ends of said levers and work endwise through guides 31 on the housing 9. Buffer blocks 32 on the bottom of the housing 9 are arranged to be engaged by the levers 27, at their inner end portions, and thereby limit the downward movement of the frame 26 and support the same, as shown by broken lines in Fig. 3.

Each selector pin 20 is provided with an upper collar 33, a lower collar 34, and an intermediate collar 35 vertically spaced, the one from the other. The collars 33 are between the bed 10 and the spring compression plate 24; the collars 35 are between the two plates 23 and 24; and the collars 34 are between the plates 22 and 23. Encircling each selector pin 20 is a coiled spring 36 which rests on the spring compression plate 24 as a spring base and engages the respective collar 33 as a spring cap. During the lowering movement of the frame 26 the plate 24 engages the collars 35 on all projected pins 20 and retracts said pins and by the time said plate has reached its lowermost position, it has engaged the collars 35 on all of the other pins 20 and thus holds all of the pins 20 with their upper ends below the upper face of the bed 10, as shown by broken lines in Fig. 3. The springs 36, when the plate 24 is in its lowermost position, are expanded to substantially their full length. The collars 34 afford electrical contacts that are movable with the pins 20, as will hereinafter appear.

Manually operated means, on the head 11, is provided for simultaneously depressing the rods 30, when said head is closed, to place the springs 36 under compression. This manually operated means may be the same as that shown and described in the patent application heretofore identified and for the purpose of this case, it is thought necessary to only show a part of said means, to wit: a pair of rod sections 37 longitudinally aligned with the rods 30 and arranged to impinge against the upper ends thereof.

The plate 24, while being lifted, moves away from the collars 35 and permits the compressed springs 36 to project the pins 20 unless said pins are intercepted, as hereinafter provided. When pressure on the rods 30 by the rod sections 37 has been removed, the frame 26 will drop under the action of gravity, together with the action of the compressed springs 36, and reset the pins 20 and permit the springs 36 to expand, as previously described, and it also resets the rods 30.

Used in connection with the improved machine is a key sheet 38, an answer sheet 39, and a frequency of error sheet, not shown. The two sheets 38 and 39 will hereinafter be fully described but it may be here stated that they are of the same size and are divided into like areas having like designations. The key sheet 38 is prepared by cutting out certain of its areas and the answer sheet 39 is prepared by piercing certain of its areas. These two sheets 38 and 39 when placed in the machine, rest on the bed 10 and are held by register guides, not shown, with corresponding areas having the same designations in corresponding relation so that if a pierced area on the sheet 39, which is uppermost, is in registration with a cut out area on the underlying sheet 38, they will leave an opening that extends completely through the sheets 38 and 39.

When the two sheets 38 and 39 are held positioned on the bed 10 each pair of coincident areas thereon is directly over one of the selector pins 20 so that if there are aligned holes in said areas the respective selector pin 20, when released by the plate 24, will be projected by its spring 36 therethrough, engage the cam surface 18 of the overlying slug 14 and move said slug from normal position.

When the slugs 14 are reset they are in their extreme left hand positions and the type characters 19 rest on the ledges 16. When the slugs 14 are moved to the right by the pins 20 the type characters 19 are moved from the ledges 16 and allow the respective end portions of the slugs 14 to drop and position said characters on inking ribbons 19' for printing action on the answer sheet 39.

For the purpose of this case, it will not be necessary to illustrate mechanism for pressing the slugs 14 projected by the pins 20 to make an impression of the type characters 19 on the answer sheet 39.

The key sheet 38 and the answer sheet 39, as shown, are ruled to form on each thereof two series of squares, spaces, or areas and each series thereof includes five vertical columns of squares of fifty squares in each row. Said columns in each series are designated by the letters $a'$, $b'$, $c'$, $d'$, $e'$, reading from the left to the right and the squares in each column of the left hand series are numbered 1 to 50 while the squares in each column of the right hand series are numbered 51 to 100, reading from the top down. The machine illustrated contains 100 slugs 14 making it possible to answer 100 questions, and hence, there is one slug for each horizontal row of five squares in each series and the cam surfaces $a$, $b$, $c$, $d$, $e$, on each slug correspond to the columns $a'$, $b'$, $c'$, $d'$, $e'$.

The squares on the two sheets 38 and 39 are identical as to size, location and number so that when said sheets are placed on the bed 10 and positioned by register guides, correspondingly designated squares are in registration, the one with the other. In fact, the two sheets 38 and 39 may be interchangeably used but preferably the key sheet 38 will be made of heavier stock than the answer sheet 39 and is on the under side. When the two sheets 38 and 39 are placed in the machine and positioned by register guides and the head 11 closed, their aligned squares are directly over the pins 20 and with the axes of said pins at the centers of said squares.

Used in connection with the machine is a printed question sheet or sheets which may have any number of questions from 1 to 100. Each numbered question on the question sheet may be answered as designated by the letters $a'$, $b'$, $c'$, $d'$, $e'$, and which designations correspond to like designations on sheets 38 and 39 and also like designations of the cam surfaces $a$, $b$, $c$, $d$, $e$.

Various types of questions may be used with this machine, such as commonly called "multiple choice" questions, "yes-no" questions, "true-false", questions, "matching" questions, and the like.

The following is one example of a "multiple choice" question:

Which is the correct answer to the following statement?
    Unorganized counties are governed by—
      $a'$. A special representative
      $b'$. Being attached to another county
      $c'$. The State legislature
      $d'$. County Commissioners
      $e'$. The Governor of the State The key sheet 38, see Fig. 2, is prepared by cutting out all of the possible wrong answer squares and leaving undisturbed the squares representing the correct answers. In the drawings the cut out squares are solid black and the undisturbed squares are white. For example, take the multiple choice question number 1 on question sheet 38, Fig. 2, and consider b' the correct anaswer. The key sheet 38 of this question will be prepared by cutting out all of the squares in row 1 except the one in b' column.

The operation of the educational test checking machine illustrated may be briefly described as follows:

From the question sheet the teacher prepares the key sheet 38 by cutting out all squares of the wrong answers and leaving the squares of the correct answers undisturbed. Each student taking the test is given an answer sheet 39 and a copy of the question sheet and answers the questions on the question sheet by punching holes in certain of the squares on the answer sheet 39 for the answers which he thinks are correct. This punching may be easily done by holding part of the answer sheet 39 over the edge of a desk and placing the point of the pencil in the center of the square to be punched and then applying sufficient pressure to the pencil to pierce the sheet 39 and form therein a hole as large as the body of the pencil which is substantially the entire area of the square. To assist in punching the answer sheet 39 with a pencil, the squares in said sheet may be weakened by scoring or otherwise.

After the student has answered the questions by piercing the squares in the answer sheet 39, which he thinks represent the correct answers to the questions on the question sheet, said answer sheet is given to the teacher. The teacher then places the prepared key sheet 38 on the bed 10 and the prepared answer sheet 39 on said key sheet and the register guides correctly position said sheets relative to each other and the pins 20. The head 11 is next closed and locked and when thus held holds the sheets 38 and 39 on the bed 10 and against lifting movement therefrom under the projecting action of certain of the pins 20, as will presently appear.

After the head 11 is locked closed the rods 30 are manually depressed, as previously described, to lift the plate 24, release the pins 20 and compress their springs 36. Spring-projected pins 20 that engage parts of the key sheet 38, that have not been cut out, will be stopped thereby, other pins 20 that have passed through cut out squares in the key sheet 38 will engage parts of the answer sheet 39 not pierced by the student and be stopped thereby. Pins 20 aligned with coincident cut out squares in the key sheet 38 and pierced holes in the answer sheet 39 will be projected therethrough and engage the overlying cam surfaces 18 and slide the respective slugs 14 to the right or into wrong answer positions. This movement of the wrong answer slugs 14 will position the type characters 19 by a slight tilting movement of said slugs on the inking ribbons 19' for printing action on the answer sheet 39 and indicate that the respective question has been incorrectly answered.

From the above description it is evident that the pins 20, that represent correct answers, have been stopped either by the key sheet 38 or the answer sheet 39 and that the pins 20, representing incorrect answers, have passed through aligned holes in the two sheets 38 and 39 and operate the overlying slugs 14. By reference to Figs. 2 and 3 it will be noted that squares in line 1, columns a', c', d', e', of the key sheet 38 have been cut out by the teacher and they represent incorrect answers and the other square, to wit: the one in column b', is undisturbed indicating a correct answer. The student has pierced a square in line 1, column b of the answer sheet 39 which is coincident with the undisturbed square on the key sheet 38 and is the correct answer. By reference to Fig. 3 it will be noted that all of the pins 20 in the left hand series have been intercepted by the answer sheet 39 with the exception of the one in column b which has been intercepted by the key sheet 38. It will thus be seen that all of the pins 20 for the respective slugs 14 have been intercepted indicating that the student has answered the respective question correctly.

By reference to Fig. 2 it will be noted that the squares in line 51 of the question sheet 38 columns a, b, c, d, are cut out indicating incorrect answers and that the square in column e is undisturbed and indicating a correct answer. By reference to Fig. 3 it will be noted that the student has pierced the square in line 51 column d which is the wrong answer and the hole thus formed is coincident with the cut out square in the key sheet 38. These coincident holes have permitted the aligned selector pin to pass therethrough to engage the aligned cam surface 18 and move the respective slug 14 into its wrong answer position, see Fig. 3. Selector pins 20 in columns a, b, c, of the respective group have been intercepted by the answer sheet 39 and the selector pin 20 in column e has been intercepted by the key sheet 38.

In place of using the key sheet 38 to intercept projected pins 20, slides or other mechanical devices may be used as illustrated in the application heretofore referred to.

The parts thus far described are substantially the same as those shown in the application heretofore referred to, except the specific mounting of the pins 20.

The machine just described is operable to select incorrect answers from correct answers on certain educational test papers and make a frequency of error record while the present invention, hereinafter described in detail, provides means for counting and registering the incorrect answers.

Referring now in detail to the present invention.

Embodied in the machine illustrated is wrong answer counting mechanism for counting incorrect answers on a given answer sheet and printing the total number of incorrect answers on said sheet before the same is removed from the machine.

As previously stated, the slugs 14 are only moved by the pins 20 when incorrect answers are given and which answers are indicated by imprints made on the answer sheet 39 by the type characters 19 on the respective slugs 14.

The wrong answer counting mechanism includes a counter having rotatable members provided with raised digits and means for inking the same. This mechanism is indicated, as an entirety, by the numeral 40 with the exception of the rotatable members 41 having raised digits and a star wheel 42. The star wheel 42, when actuated, intermittently operates connections 42' for imparting a step of rotary movement to one or more of the rotatable members 41 for each incorrect answer and successively positioning the digits in numerical order for printing action.

The counter 40 is carried on the free end of a horizontally disposed spring arm 43 mounted on an upstanding post 44, secured to the bed 10 at the right of the head 11, for swinging movement about the axis of said post. Normally, the arm 43 holds the counter 40 above the bed 10 for movement into a position over the upper end portion of the answer sheet 39 for printing action thereon. On top of the counter 40 is a handpiece 45 to which pressure may be applied to spring the arm 43 and position the exposed digits, on the rotatable members 41, and cause the same to print on the answer sheet 39 the total number of incorrect answers represented therein.

Electrically operated means is provided for imparting a step of rotary movement to the star wheel 42 for each slug 14 when moved into its wrong answer position by one of the pins 20. This electrically operated means for each slug 14 includes a source of potential 46, one side of which is connected to a ground 47 and the other side of which is connected to a common lead 48 in which is interposed a switch 49 comprising two fixed contacts on the bed 10 and a correspondingly movable contact 50 on the carrier arm 43. Connected to the common lead 48 is a branch lead 51 for each slug 14 and which branch lead is connected to one side of a magnetic coil 52 having a floating core 53. The other side of each coil 52 is connected to a fixed contact bar 54. There is one of these contact bars 54 for the group of pins 20 for each slug 14 and which bar is connected to a ground 55. The fixed contact bars 54 are secured to the insulating plate 23, on the under side thereof, and have large holes through which the pins 20 project without coming in contact with said bars. When a pin 20 is projected, as shown in Fig. 3, its movable contact 34 is in direct engagement with the respective fixed contact bar 54. When one of the movable contacts 34 is in engagement with the corresponding fixed contact bar 54, it is important to note that the collars 33 and 35 are out of contact with the bed 10 and the plate 23, respectively, so that there is a good contact between the engaged contacts 34 and contact bars 54.

It will also be noted that when the projecting movements of the pins 20 are intercepted by the engagement of said pins with either the key sheet 38 or the answer sheet 39, see Fig. 3, that the contacts 34 and the collars 35 are out of engagement with the contacts 54 and the plate 22, respectively, so that said pins are yieldingly held against said sheets by their springs 36.

Obviously, the branch leads 51 are always broken when the head 11 is open and when the projecting movement of the pins 20 has been intercepted by either the key sheet 38, the answer sheet 39, or other means. Or, in other words, the branch leads 51 are only closed when a pin has been projected through aligned holes in the sheets 38 and 39. This happens only in case of incorrect answers.

The coils 52 are mounted in a segmental housing 56 on the bed 10, to the right of the head 11, and the center of said housing is at the axis of the post 44. This housing 56 is closed, except at its inner face, and the cores 53, at their outer end portions, work in holes in an annular guide ring 57 concentric with said housing and which ring is supported by legs secured to the bed 10. It will be noted that the cores 53 are arranged in upper, intermediate and lower horizontal rows and that the cores 53 of the intermediate row are straight while the cores 53 of the upper and lower rows, outwardly of the respective cores 52, are bent to bring their outer end portions into the same horizontal plane as the outer end portions of the cores 53 of the intermediate row. Or, in other words, the outer end portions of all of the cores 53 are in the same horizontal plane.

On the outer ends of the cores 53 are heads 58, arranged to engage the respective ends of the cores 52, and limit the projecting movement thereof, see Fig. 5. The inner end portions of the cores 53, when projected, are in the path of movement of the star wheel 42 and when the carrier arm 53 is swung about the axis of the post 44, the fingers of said star wheel are progressively brought into engagement with the projecting cores 53 and each of said cores will impart a step of rotary movement to the star wheel 42.

When a slug 14 is moved into wrong answer position, by a projected pin 20, its movable contact 34 is brought into engagement with the respective fixed contact bar 54 and completes the circuit through the respective branch lead 51. This closing of a branch lead 51 energizes the respective coil 52, projects its core 53, and thereby imparts a step of movement to the star wheel 42 as the same is manually swung anti-clockwise about the axis of the post 44. Obviously, each projected core 53 represents a wrong answer and each step of movement imparted to the star wheel 42 by a projected core 53 positions the rotatable member or members for the next higher digit or number.

The anti-clockwise initial bodily movement of the counter 40 moves the switch contact 50 out of engagement with the fixed switch contacts 49 and thereby breaks the main lead 48 and de-energizes the coils 52.

Immediately after the star wheel 42 passes out of engagement with a projected core 53 said core is reset or retracted by a presser foot 59 on the counter 40 and which foot slides with yielding action on the inner face of the guide ring 57 and successively engages the projected cores 53 with a cam action that retracts the same. At the completion of the resetting of the cores 53 the counter 40 is positioned, as shown in Figs. 1 and 2, and in which position said counter is directly over the top portion of the answer sheet 39. With the counter 40 thus positioned downward pressure on its hand-piece 45 will spring the arm 43 and bring the exposed digit or digits on the rotatable counter members 41 onto the answer sheet 39 and thereby print thereon the total number of wrong answers given or indicated on the answer sheet 39.

Obviously, when pressure on the hand-piece 45 is removed, the arm 43 will automatically lift the counter above the answer sheet 39 after each printing so that the same will be freely swung clear of said sheet as well as the head 11. It may be here stated that the counter must be reset after each printing action so that the next time the counter is operated to total the number of incorrect answers the same will start from zero.

From the foregoing it must be evident that the invention herein disclosed is capable of large range of modification within the spirit of the invention herein disclosed and claimed.

What I claim is:

1. In a device of the class described, a plurality of selectors, means for operating the selectors, means for individually intercepting the selectors when operated, said device having means for holding a sheet having designated areas in the same general relation to each other as the selectors are to each other and in their respective paths of movement, said sheet in certain of its areas being pierced, whereby when the selectors are operated certain thereof will pass through pierced areas of the sheet and certain others thereof may be stopped by the sheet or the other intercepting means, a counter mechanically held for movement in a given course, and a plurality of counter operating members arranged to be positioned by actuated selectors, the movable mechanism of the counter having a part arranged to be operated by said members, when positioned by actuated selectors, during movement of the counter in its course.

2. In a device of the class described, a bed, a displaceable head over the bed, a carrier under the bed, a group of selector pins mounted on the carrier and extending through guides in the bed, means for operating the carrier to project or retract the selector pins, means for intercepting the selector pins when projected, said device having means for holding a sheet having designated areas in the same general relation to each other as the selector pins are to each other and in their respective paths of movement, said sheet in certain of its areas being pierced, whereby when the selector pins are projected by the carrier certain thereof will pass through pierced areas of the sheet and certain others thereof may be stopped by the sheet or the other intercepting means, a counter mechanically held for movement in a given course, and a plurality of counter operating members arranged to be positioned by actuated selectors, the movable mechanism of the counter having a part arranged to be operated by said members, when positioned by actuated selectors, during movement of the counter in its course.

3. In a device of the class described, a plurality of groups of selectors, means for operating the selectors, means for individually intercepting the selectors when operated, said device having means for holding a sheet having designated areas in the same general relation to each other as the selectors are to each other and in their respective paths of movement, said sheet in certain of its areas being pierced, whereby when the selectors are operated certain thereof will pass through pierced areas of the sheet and certain others thereof may be stopped by the sheet or the other intercepting means, a counter mechanically held for movement in a given course, the movable mechanism of the counter having an actuating member, and means for operating the actuating member of the counter during movement of the counter in its course, including a source of potential having a common lead, a switch interposed in said lead and including a pair of relatively fixed contacts and a co-operating movable contact carried by the counter, a magnetic coil having a floating core for each group of selectors, a branch lead connecting each coil to the common lead, and a switch in each branch lead, normally held open by the respective selector when in an inoperative position and automatically closed when said selector is moved into an operative position, said cores being projected, when their coils are energized, into the path of movement of the actuating member of the counter for operating the same.

4. In a device of the class described, a plurality of groups of selectors, means for operating the selectors, means for individually intercepting the selectors when operated, said device having means for holding a sheet having designated areas in the same general relation to each other as the selectors are to each other and in their respective paths of movement, said sheet in certain of its areas being pierced, whereby when the selectors are operated certain thereof will pass through pierced areas of the sheet and certain others thereof may be stopped by the sheet or the other intercepting means, a counter mechanically held for movement in a given course, the movable mechanism of the counter having an actuating member, and means for operating the actuating member of the counter during movement of the counter in its course, including a source of potential having a common lead, a switch interposed in said lead and including a pair of relatively fixed contacts and a co-operating movable contact carried by the counter, a magnetic coil having a floating core for each group of selectors, a branch lead connecting each coil to the common lead, and a switch in each branch lead, normally opened by the respective selector when moved to an inoperative position and closed by said selector when moved into an operative position, said cores being projected, when their coils are energized, into the path of movement of the actuating member of the counter for operating the same.

SAMUEL R. HARDING.